United States Patent
Ishizaki et al.

(10) Patent No.: US 6,810,421 B1
(45) Date of Patent: Oct. 26, 2004

(54) COMMUNICATION NETWORK SYSTEM AND METHOD FOR CONTROLLING SERVICES IN A COMMUNICATION NETWORK SYSTEM

(75) Inventors: Takeshi Ishizaki, Yokohama (JP); Masatoshi Takihiro, Yokohama (JP); Osamu Takada, Sagamihara (JP); Tohru Setoyama, Fujisawa (JP); Kenichi Yoshida, Kitamoto (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 09/480,199

(22) Filed: Jan. 10, 2000

(30) Foreign Application Priority Data

Jan. 11, 1999 (JP) .......................................... 11-004305

(51) Int. Cl.[7] .............................................. G06F 13/00
(52) U.S. Cl. ...................................... 709/226; 709/224
(58) Field of Search .............................. 709/226, 238, 709/200, 242, 217, 240, 241, 203, 218, 219, 223, 224, 225

(56) References Cited

U.S. PATENT DOCUMENTS

| | | | | |
|---|---|---|---|---|
| 4,912,656 A | * | 3/1990 | Cain et al. ..................... 709/242 |
| 5,167,035 A | * | 11/1992 | Mann et al. ..................... 714/4 |
| 5,347,633 A | * | 9/1994 | Ashfield et al. ............. 709/238 |
| 5,539,881 A | * | 7/1996 | Hunt et al. ................... 709/242 |
| 5,574,849 A | * | 11/1996 | Sonnier et al. ................ 714/12 |
| 5,644,720 A | * | 7/1997 | Boll et al. .................... 709/227 |
| 5,751,967 A | * | 5/1998 | Raab et al. ................... 709/228 |
| 5,822,580 A | * | 10/1998 | Leung ...................... 707/103 R |
| 6,014,698 A | * | 1/2000 | Griffiths ...................... 709/224 |
| 6,032,175 A | * | 2/2000 | Fletcher et al. .............. 709/200 |
| 6,092,191 A | * | 7/2000 | Shimbo et al. .............. 713/153 |
| 6,098,108 A | * | 8/2000 | Sridhar et al. .............. 709/239 |
| 6,101,541 A | * | 8/2000 | Ellesson et al. ............. 709/225 |
| 6,185,184 B1 | * | 2/2001 | Mattaway et al. ........... 370/230 |
| 6,249,873 B1 | * | 6/2001 | Richard et al. .............. 713/200 |
| 6,266,701 B1 | * | 7/2001 | Sridhar et al. .............. 709/232 |
| 6,298,451 B1 | * | 10/2001 | Lin ................................. 714/4 |
| 6,324,582 B1 | * | 11/2001 | Sridhar et al. .............. 709/230 |

FOREIGN PATENT DOCUMENTS

JP        04230567        8/1992

* cited by examiner

*Primary Examiner*—Moustafa M. Meky
(74) *Attorney, Agent, or Firm*—Sofer & Haroun, LLP

(57) ABSTRACT

The object of the present invention is to provide a communication network system that reduces the burden of entering settings for the network system. A service directory server in the communication network system provides unified management of the service information of the service-providing server installed in the network. The service information managed by the service directory server is distributed to the communication nodes either automatically or in response to requests from a communication node. The communication nodes receive packets and, for received packets that are addressed to itself, a service-providing server destination is determined based on the service information provided by the service directory server and the packet is transferred to the server to receive the service.

15 Claims, 17 Drawing Sheets

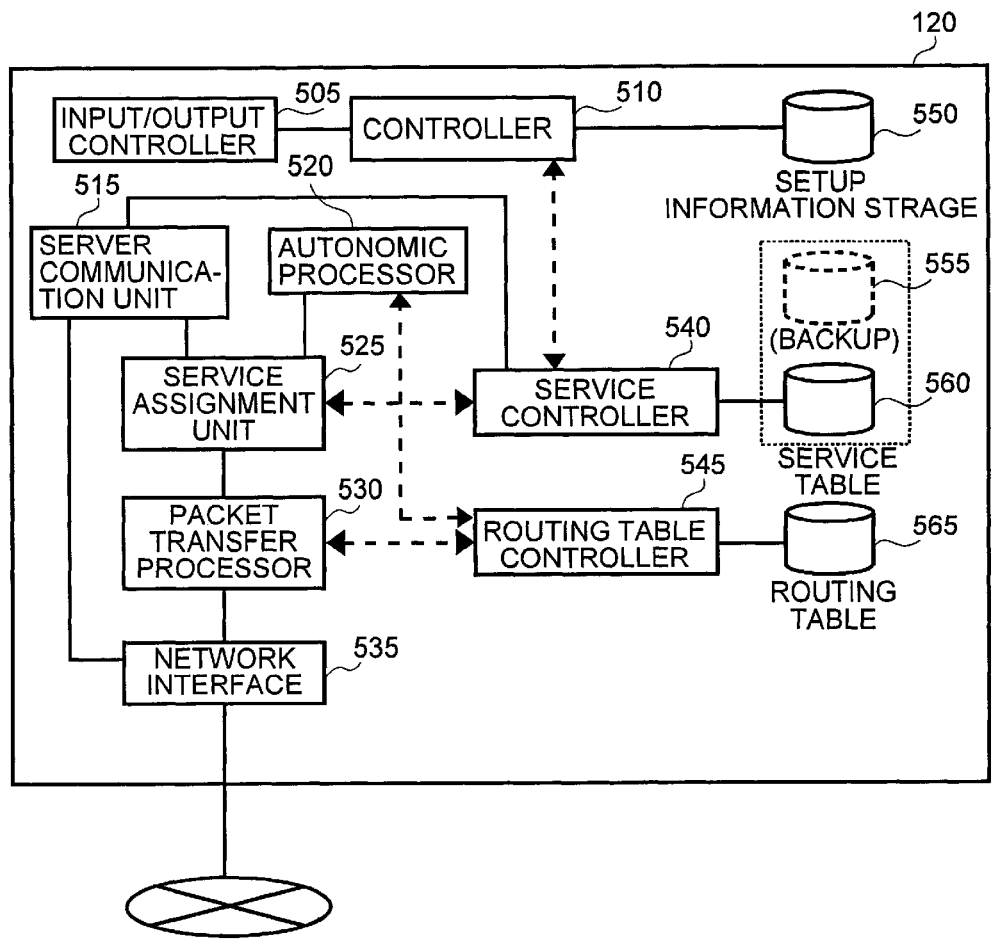

| DESTINATION ADDRESS | NETMASK | GATEWAY ADDRESS | INTERFACE |
|---|---|---|---|
|  |  |  |  |
|  |  |  |  |
|  |  |  |  |

710  720  730  740

| HEADER | 1305 |
| SEQUENCE UMBER | 1310 |
| NODE ID | 1320 |
| AUTHENTICATION INFORMATION | 1330 |

COMMUNICATION NETWORK SYSTEM AND METHOD FOR CONTROLLING SERVICES IN A COMMUNICATION NETWORK SYSTEM

RELATED APPLICATIONS

This application is related to and claims the benefit of priority from Japanese Patent Application No. 11-004305, filed on Jan. 11, 1999, the entirety of which is incorporated herein by reference.

BACKGROUND OF THE INVENTION

The present invention relates to a communication network system providing a plurality of services. More specifically, the present invention relates to a technology for reducing administration costs for network systems having large-scale backbones.

With the emergence of the WWW (World Wide Web), the use of data communications through IP (Internet Protocol) is expanding rapidly. With IP communications that use the WWW, communications do not need to center on data as before but can also involve the sending and receiving of multimedia information such as audio and video. Thus, there is a demand for large-scale backbone networks that can handle high-speed transfers of growing volumes of data.

As networks become larger in scale, the management of communication resources within the network becomes an issue. Providing consistent communication quality for transfers of large amounts of data requires servers that manage the resources within the network. For example, there is a need to provide a division of labor, e.g., a plurality of communication nodes executes packet transfers that require high-speed processing, while servers provide services that require complex processing such as routing and communication resource management.

In communications carriers and large-scale internet service providers that provide large-scale network services, this type of division of labor is crucial in order to provide high performance while also allowing low-cost administration.

The advantage of using these types of servers is that since there are fewer points where information is managed, there are fewer devices to be administered by the network administrator, thus reducing operating costs.

However, as networks get larger in scale and the types of services provided by these networks increase, the types of servers used to provide these services to the communication nodes will also increase. In such cases, the settings in each of the communication nodes that use these services have to be updated every time a new service-providing server is installed or the settings for the services provided by existing servers are changed.

For example, new settings must be entered into the communication nodes to indicate the address information used to access the new servers as well as information needed to use services.

In large-scale network systems where many communication nodes are running, a huge amount of work is required when settings are changed or services are introduced. Thus, as the number of services provided increases, the work involved in updating settings increases and system administration is made more complex. As a result, introducing new services is time consuming and leads to increases in administration costs. Also, when the work involved in entering settings increases, the possibility that errors will be made in these settings will also increase, thus reducing the reliability of the network system.

SUMMARY OF THE INVENTION

The object of the present invention is to reduce administration costs in a network system. More specifically, in a large-scale network system operating with many communication nodes, the object of the present invention is to reduce administration costs by reducing the burden involved in entering settings even when a new service-providing server is installed or the service provided by an existing server is changed.

In order to overcome the problems described above, the present invention centralized control of information about the service-providing servers installed in the network using a directory server set up separately from the service-providing servers. This information is sent to the communication nodes in the network either automatically or in response to requests from communication nodes.

More specially, the present invention is a communication network system including at least one communication node transferring a received packet to a destination affixed to the packet, at least one server providing a predetermined service, and a directory server. The directory server includes means for storing storing service information relating to conditions for receiving services provided by the servers and means for providing information providing the service information stored in storing means to the communication nodes.

The communication node includes: means for determining a server for processing packets of a predetermined type out of the received packets based on service information provided by the directory server; and means for transferring predetermined packets transferring the predetermined types of packets to the server determined by the determining means.

The predetermined types of packets referred to here indicate, for example, packets relating to services provided by the network such as packets relating to routing and communication quality management. These packets generally are assigned addresses of communication nodes requesting processing as the destination address. In the present invention, the directory server provides unified management of service information indicating, e.g., definitions for packets relating to specific services, addresses of servers providing these services, and packet processing that must be performed by the communication node receiving these services. Service information is sent to the communication nodes in the network either automatically or in response to requests from the communication nodes.

Based on service information provided by the directory server, the communication nodes determines a server to process packets of a predetermined type out of the received packets.

Thus, according to the present invention, the network administrator does not need to enter settings in all of the communication nodes even when a server is newly added to the network or if the service provided by an existing server changes. The network administrator need only maintain and manage the service information stored in the directory server, making changes when needed. Thus, network administration costs can be reduced.

BRIEF DESCRIPTION OF THE DRAWINGS

FIG. 5 is a functional block diagram of a communication node 120.

FIG. 6 is a drawing for the purpose of describing the contents of a service table stored in a service table storage unit 560.

DESCRIPTION OF THE PREFERRED EMBODIMENT

Figure 1:
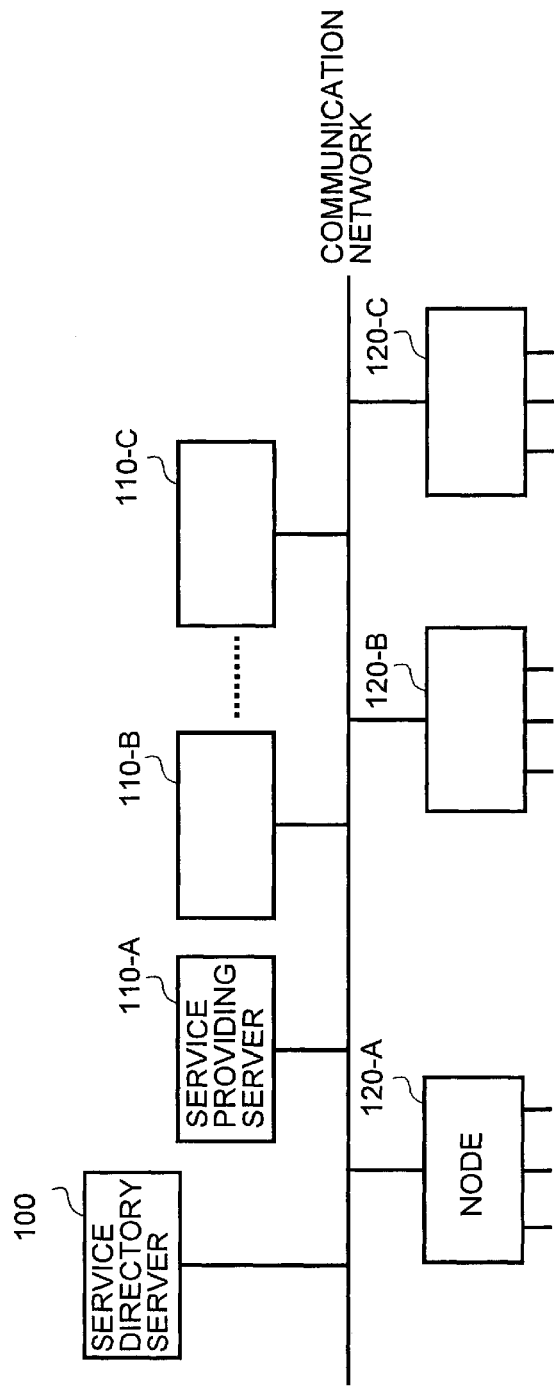
FIG. 1 is a schematic drawing of the structure of a network system providing integrated services in which the present invention is implemented.

FIG. 1 shows a schematic drawing of the architecture of an network system with integrated services in which the present invention is implemented.

As shown in the figure, the network system with integrated services includes a service directory server 100; a plurality of service-providing servers 110 (110-A–110-C); and a plurality of communication nodes 120 (120-A–120-C) connected to each other via a communication network.

For each of the plurality of service-providing servers 110 installed in the network, the service directory server 100 performs unified management of service information such as the address of the server and the definitions of the packets processed by the server. The service directory server 100 provides service information automatically or in response to requests from the communication nodes 120.

The communication nodes 120 are equipped to serve as IP (Internet Protocol) routers and transfer incoming data packets to the addresses attached to these packets.

In addition, the communication nodes query the service directory server 100 to obtain service information and sends the packets to the appropriate service-providing server 110 to be processed.

The service-providing server 110 receives packets from the communication nodes 120 for services that it provides and performs the necessary processing.

The following is a description of the hardware architecture of the different devices in the network system providing integrated services.

Figure 2:
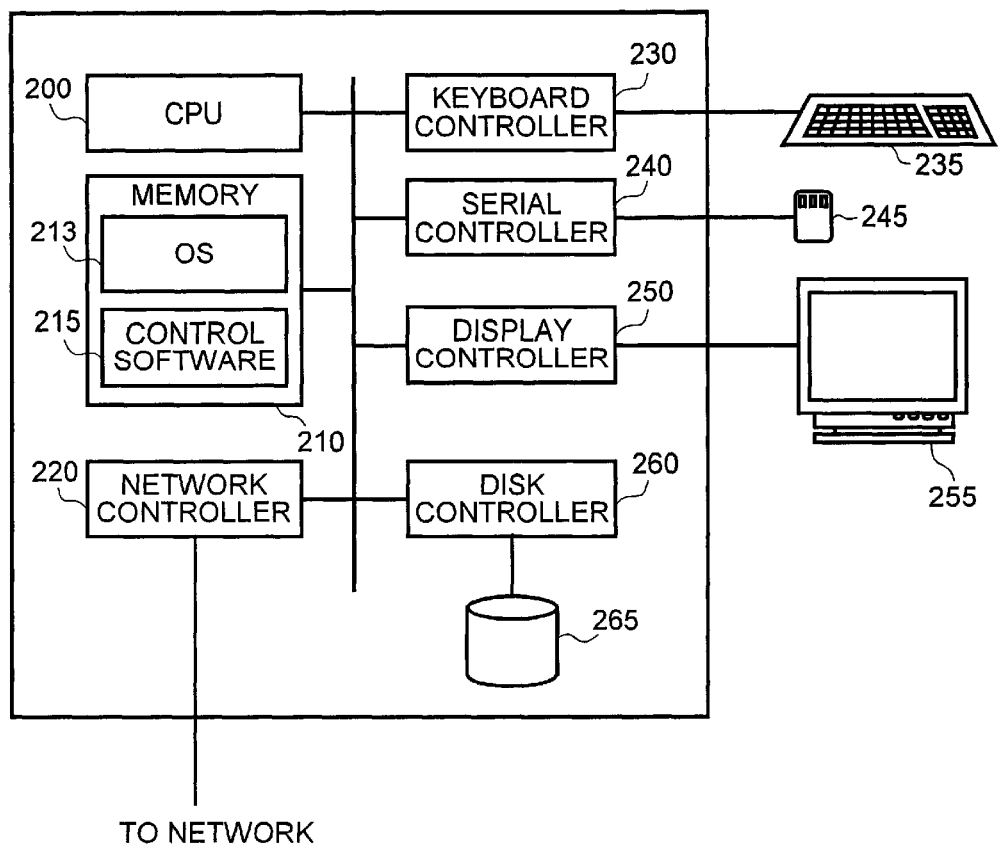
FIG. 2 is a drawing showing an example of the hardware architecture for a service directory server 100, a service-providing server 110, and a communication node 120.

FIG. 2 is a drawing showing a sample hardware architecture for the service directory server 100, the service-providing server 110, and the communication node 120.

As shown in the drawing, the devices in the network system providing integrated services can be built atop a data processing device, e.g., a P.C. (personal computer), having a standard architecture.

A CPU (central processing unit) 200 is a processor for executing programs stored in a memory 210. The memory 210 stores an operating system (OS) 213, which provides overall control over the device, and a control program 215, which makes the device function as the service directory server 100, the service-providing server 110, or the communication node 120. A network controller 220 controls sending and receiving to and from the network. A keyboard controller 230 controls key entry from a keyboard 235. A serial controller 240 controls input/output devices such as a mouse 245 connected to a serial port. A display controller 250 controls display to a display monitor 255. A disk controller 260 controls input/output to and from a disk device 265.

In the hardware block diagram shown in FIG. 2, the control program 215 can be a service directory server control program to make the device perform the functions, described later, shown in FIG. 3. Alternatively, by using a service-providing server control program, the device can perform the functions, described later, shown in FIG. 4. Alternatively, by using a communication node control program, the device can perform the functions, described later, shown in FIG. 5.

The sample hardware architecture shown in FIG. 2 is only one possible example. For example, in the communication node 120, known technology components can be substituted, e.g., a special hardware transfer mechanism can be used to increase the packet transfer processing speed. Next, the functional architecture of the devices in the network system providing integrated services will be described.

Figure 3:
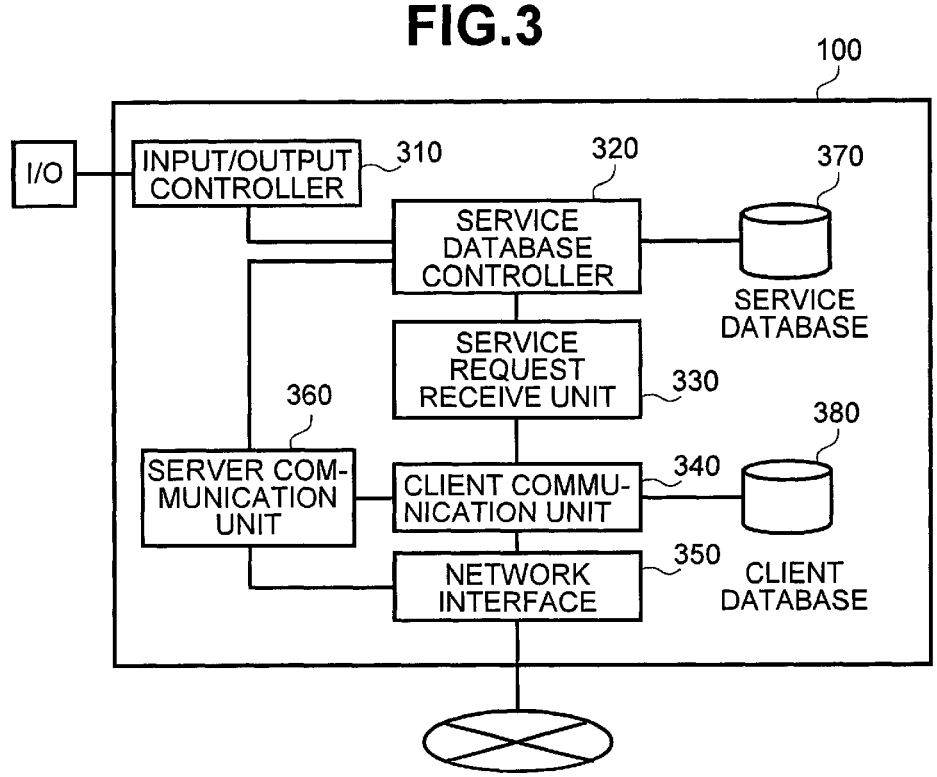
FIG. 3 is a functional block diagram of a service directory server 100.

FIG. 3 is a drawing showing the functional architecture of the service directory server 100.

As shown in the figure, the service directory server 100 includes: an input/output controller 310; a network interface 350; a server communication unit 360; a client communication unit 340; a client database 370; a service request receiving unit 330; a service database controller 320; and a service database 370.

The input/output controller 310 controls input from an input device such as a keyboard and output to an output device such as a display.

The network interface unit 350 functions as an interface with the network by receiving packets from the network and sending them to appropriate process modules and by sending packets to the network at the request of other process modules.

The service database 370 stores the service information for each of the plurality of service-providing servers 110 installed in the network.

The service database controller 320 manages the service database 370 and updates the service database 370 in response to instructions received from a network administrator via the input/output controller 310.

The client database 380 stores registration information, such as the address, for each of the plurality of communication nodes 120 installed in the network.

The server communication unit 360 controls and manages communications with each of the plurality of service-providing servers 110 installed in the network via the network interface unit 350.

The server communication unit 340 control and manages communications with each of the plurality of communication nodes installed in the network. For example, the server communication unit 340 performs session management for each of the communication nodes.

The service request receiving unit 330 receives requests for service information from the communication nodes 120 via the network interface 350 and the client communication unit 340. The service request receiving unit 330 then requests service information from the service database 370 via the service database controller 320 as necessary, and sends this information to the communication node that issued the request.

Figure 4:
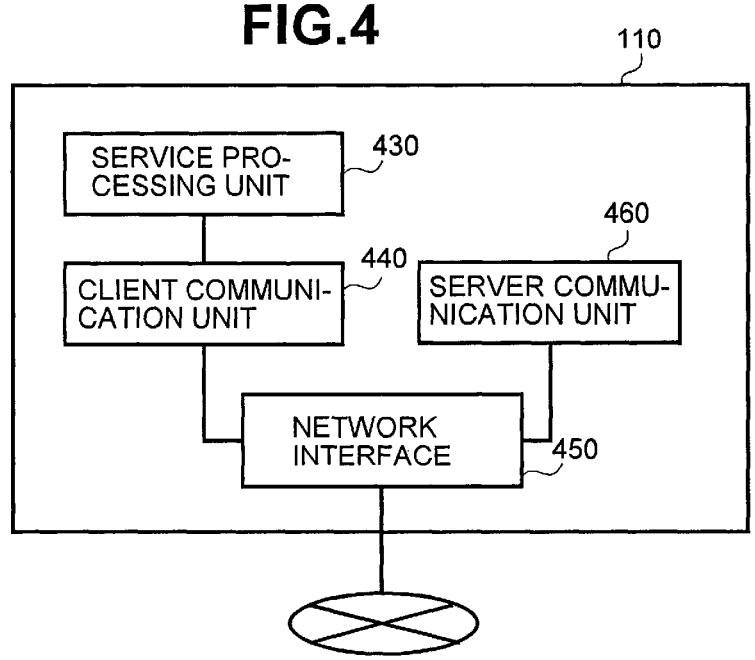
FIG. 4 is a functional block diagram of a service-providing server 110.

FIG. 4 is a drawing of the functional architecture of the service-providing server 110.

As shown in the figure, the service-providing server 110 includes a network interface 450, a server communication unit 460, a client communication unit 440, and a service processing unit 430.

The network interface unit 450 functions as an interface with the network by receiving packets from the network and sending them to appropriate process modules and by sending packets to the network at the request of other process modules.

The server communication unit 460 controls and manages communication with the service directory server 100 via the network interface 450.

The client communication unit 440 controls and manages communication with the plurality of communication nodes 120 installed in the network via the network interface 450. More specifically, packets received from a communication node 120 via the network interface 450 are passed on to the service processing unit 430. Also, packets received from the service processing unit 430 are sent to a communication node 120 via the network interface 450.

The service processing unit 430 provides a predetermined service by performing specific operations on packets received from the client communication unit 440. Examples of the predetermined services referred to here include processing for routing protocols such as OSPF (Open Shortest Path First) and BGP (Border Gateway Protocol) and processing for communication quality protocols such as RSVP (Resource Reservation Protocol).

FIG. 5 is a drawing showing the functional architecture of the communication node 120.

As shown in the figure, the communication node 120 includes an input/output communication unit 505, a communication controller 510, a settings information storage unit 550, a network interface 535, a packet transfer processing unit 530, a service assignment unit 525, a routing table controller 545, a routing table storage unit 565, a service communication unit 515, an autonomic processor 520, a service controller 540, a service table storage unit 560, and a backup file storage unit 555.

The input/output controller 505 controls input from an input device such as a keyboard and output to an output device such as a display.

The settings information storage unit 550 stores settings needed for standard IP transfers such as the IP address information for the communication node 120 and information for packet filtering. In addition, the address of the service directory server 100 and timer information for blocking queries to the service directory server 100, described later, are also saved here as settings information.

The controller 510 manages the settings information stored in the settings information storage unit 550. This settings information is set up beforehand by an administrator. In response to instructions from an administration received via the input/output controller 505, the controller 510 stores settings information in the settings information storage unit 550 and updates settings information stored in the settings information storage unit 550.

The network interface 535 serves as an interface with the network by receiving packets from the network and passing them on to the appropriate process modules and by sending packets to the network in response to requests from other process modules.

The routing table storage unit 565 stores a routing table used for transferring packets. This routing table will be described later.

The routing table controller 545 manages the routing table stored in the routing table storage unit 565.

The service table 560 stores a service table in which service types are associated with the addresses of the corresponding service-providing servers and the like. This service table will be described later.

The backup file storage unit 555 stores a backup file of the service table stored in the service table storage unit 560.

The packet transfer processor 530 obtains the routing table stored in the routing table storage unit 565 via the routing table controller 545, determines a gateway corresponding to the destination address of an incoming packet based on this routing table, and transfers the received packet to this gateway via the network interface 535. Also, packets addressed to its own communication node are sent to the service assignment unit 525.

The service assignment unit 525 transfers packets addressed to its own communication node to a service-providing server 110 that provides the service corresponding to the packet and performs assignment operations to process the packet within its own communication node. More specifically, the service assignment unit 525 obtains the service table stored in the service table storage unit 560 via the service controller 540. Based on this service table, the service assignment unit 525 decides whether a packet addressed to its own communication node is transferred to a service-providing server 110 or is processed within its own communication node. If the packet is to be transferred to a service-providing server 110, the packet is sent to the server communication unit 515. If the packet is to be processed within its own communication node, the packet is sent to the autonomic processor 520.

The autonomic processor 520 processes packets addressed to its own communication node based on instructions from the service assignment unit 525. The nature of this processing varies depending on the settings of the communication node.

Also, based on the results from packet processing, the autonomic processor 520 updates the routing table stored in the routing table storage unit 565 via the routing table controller 545.

The server communication unit 515 responds to instructions from the service assignment unit 525 and transfers packets addressed to its own communication node to the service-providing server providing the service corresponding to the packet via the network interface 535. Also, based on instructions from the service controller 540, requests for service information are sent to the service directory server 100 via the network interface 535. Furthermore, service information provided by the service directory server 100 is received and passed on to the service controller 540.

The service controller 540 manages the service table stored in the service table storage unit 560. Also, information for accessing the service directory server 100 is obtained from the settings information storage unit 550 via the controller 510. Using this information, requests for service information from the service directory server 100 are sent to the server communication unit 515. Based on the service information received from the server communication unit 515, the service table stored in the service table storage unit 560 is updated.

The following is a description of a service table stored in the service table storage unit 560 of the communication node 120 shown in FIG. 5.

FIG. 6 is a drawing for the purpose of describing the contents of the service table stored in the service table storage unit 560.

As shown in the figure, the service table stores, in the form of a table, service information provided by the service directory server 100.

Each service entry includes a service ID 610 uniquely identifying the service entry, a service name indicating the type of service, an assignment condition 630 used for assignments performed by the service assignment unit 525, an address 640 of the service-providing server 110 providing the service, and an optional client processing script 650.

The assignment algorithm 630 can, for example, include a combination of a packet protocol number and port number. The service assignment unit 525 extracts the packet protocol number and port number and compare this information with the assignment algorithm 630 to determine an assignment destination. Instead of a combination of a packet protocol number and port number, the assignment condition 630 can use other information contained in packets.

The client processing script 650 is optional. By specifying a client processing script 650, it would be possible, for example, to have the autonomic processor 520 extract information from the packet or process the packet before the packet is to be sent to a service-providing server 110.

The following is a description of the routing table stored in the routing table storage unit 565 of the communication node 120 shown in FIG. 5.

Figures 7, 8, 9:
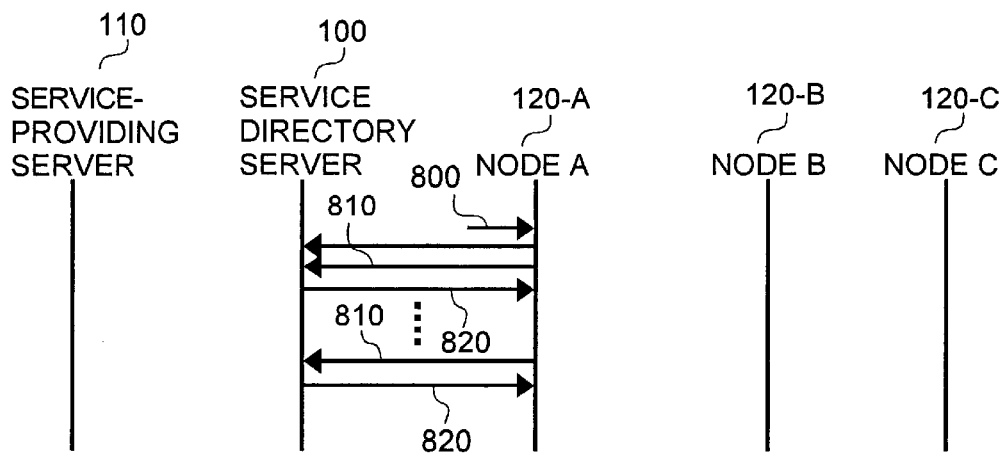
FIG. 7 is a drawing for the purpose of describing a routing table stored in a routing table storage unit.
FIG. 8 is a drawing showing an initialization sequence for a communication node 120.
FIG. 9 is a drawing for the purpose of describing the contents of an OPEN message sent by a communication node 120 to a service directory server 100.

FIG. 7 is a drawing for the purpose of describing the contents of the routing table stored in the routing table storage unit 565.

As shown in the figure, the routing table contains a plurality of routing entries stored in the form of a table. Each routing entry contains a destination address 710, a netmask 720, a gateway address 730, and an interface 740.

The packet transfer processing unit 530 searches the routing table 465 using the destination address of a received packet as a key. When performing the search, the netmask information is used in the same way as in a standard router, and the routing entry with the address having the longest match with the destination address is selected. If there is no routing entry that matches the destination address, the packet transfer processing unit 530 discards the packet and notifies the packet sending source of an error. If a routing entry matching the destination address is found, the packet transfer processing unit 530 transfers the packet based on the gateway address 630 and the interface 640.

The following is a description of the operation of the network system providing integrated services described above. In this embodiment, communications between devices is performed through connections established using TCP (Transmission Control Protocol).

The following is a description of the initialization of the communication node 120.

FIG. 8 is a drawing showing the initialization sequence for a communication node 120. This figure shown the initialization sequence for the communication node 120-A, but the same operations apply to the other communication nodes 120.

In FIG. 8, a network administrator initializes the settings in the communication node 120 relating to the service directory server 100 (these settings need only be made once when the communication node 120 is first used) (sequence 800). Then, the communication node 120 sends an OPEN message to the service directory server 100 (sequence 805), and informs the service directory server 100 of its own existence. The service directory server 100 receives this and registers the communication node 120 that sent the OPEN message into the client database 380.

FIG. 9 is a drawing for the purpose of describing the contents of the OPEN message sent by the communication node 120 to the service directory server 100. A header 1305 is a message header containing a message type and a message length. A sequence number 1310 is an initial value for a sequence number used in the subsequent session. A node ID 1320 is a number that uniquely identifies the communication node 120 sending the OPEN message. A node ID 1320 is assigned beforehand to each of the communication nodes installed in the network to allow the communication nodes 120 to be identified uniquely. An authentication information 1330 is information used by the service directory server 100 to determine if the received OPEN message was sent by the correct communication node 120 or not.

Returning to FIG. 8, the communication node 120 sends the service directory server 100 a QUERY message, which is a message requesting service information (sequence 810). Receiving this, the service directory server 100 returns a REPLY message containing the service information to the communication node 120 that sent the QUERY message (sequence 820).

Figure 10:
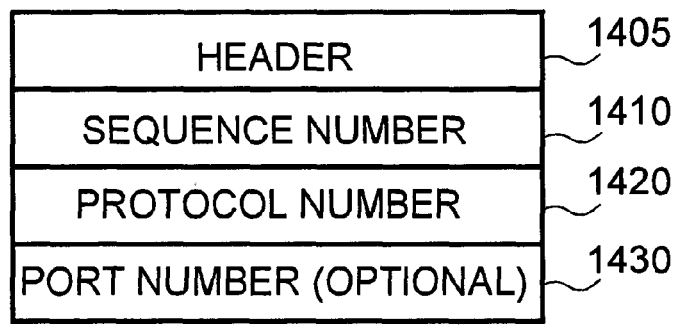
FIG. 10 is a drawing for the purpose of describing the contents of a QUERY message sent by a communication node 120 to a service directory server 100.

FIG. 10 is a drawing for the purpose of describing the contents of the QUERY message sent by the communication node 120 to the service directory server 100. A header 1405 is a message header containing a message type and a message length. A sequence number 1410 is a number that is incremented by one each time the communication node 120 sends a new QUERY message. This sequence number 1410 is used to check its association with a REPLY message, to be described later. A protocol number 1420 and a port number 1430 are the protocol number and the port number associated with the queried service, i.e., the service for which information is requested. The service associated with a packet can be determined by looking at the fields referred to as the protocol number, which is included in all packets, and the port number, which is included in packets for certain services.

When a communication node 120 queries the service directory server 100 for service information, the communication node 120 specifies the protocol number and the port number associated with the service information. However, if the protocol number 1420 is 0 (zero), the query is not for specific information but is rather a request to have all the service information at the service directory server 100 returned one at a time in sequence. For services that do not use port numbers, the port number 1430 is set to 0 (zero).

Figure 11:
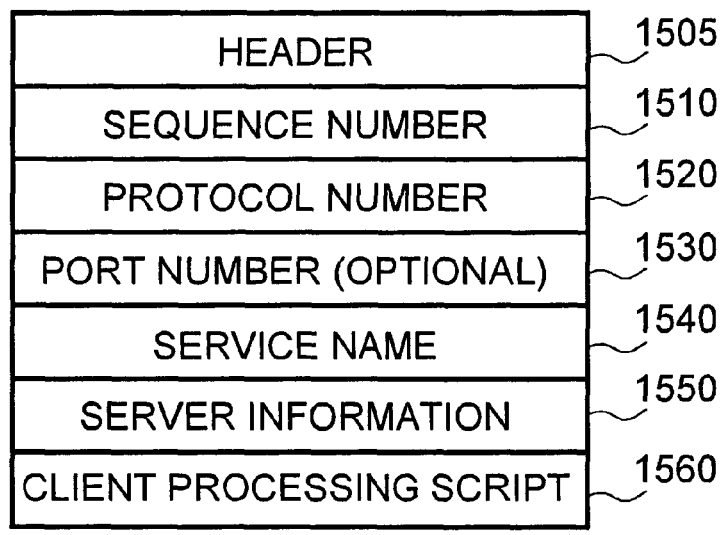
FIG. 11 is a drawing for the purpose of describing the contents of a REPLY message sent by a service directory server 100 to a communication node 120.

FIG. 11 is a drawing for the purpose of describing the REPLY message sent by the service directory server 100 to the communication node 120. A header 1505 is a message header containing a message type and a message length. A sequence number 1510 is a number used to determine which QUERY message the REPLY message is associated with. In other words, if the sequence number 1510 contained in the REPLY message is X, this indicates that the REPLY message is a reply to a QUERY message having a sequence number of X. A protocol number 1520 and a port number 1530 are the protocol number and the port number associated with a service. The protocol number 1520 and the port number 1530 have the same meanings as the protocol number 1420 and the port number 1430 contained in the QUERY message shown in FIG. 10. However, if the protocol number 1520 is 0 (zero), this indicates that there is no associated service. A service name 1540 is a string indicating the type of service and is provided for convenience in maintaining service information. A server information 1550 is information relating to the service-providing server 110 providing the service. This information contains at least the address of the service-providing server 110.

A client processing script 1560 is a program representing a series of operations to be performed by the communication node 120 before the service is provided by the service-providing server 110. If the service does not require client processing, the client processing script 960 is left blank. Thus, since a client processing script can be specified as service information, it would be possible to achieve finely tuned service definitions where, for example, simple operations are performed by the communication nodes 120 and the remaining operations are left to the servers.

Returning to FIG. 8, the communication node 120 and the service directory server 100 repeat this give and take of REPLY messages and QUERY messages until the communication node 120 obtains the desired service information from the service directory server 100.

Next, the initialization sequence for the communication node 120 shown in FIG. 8 will be described in more detail, with the operations performed by the communication node 120 described separately from the operations performed by the service directory server 100.

First, the operations performed by the communication node 120 will be described.

Figure 12:
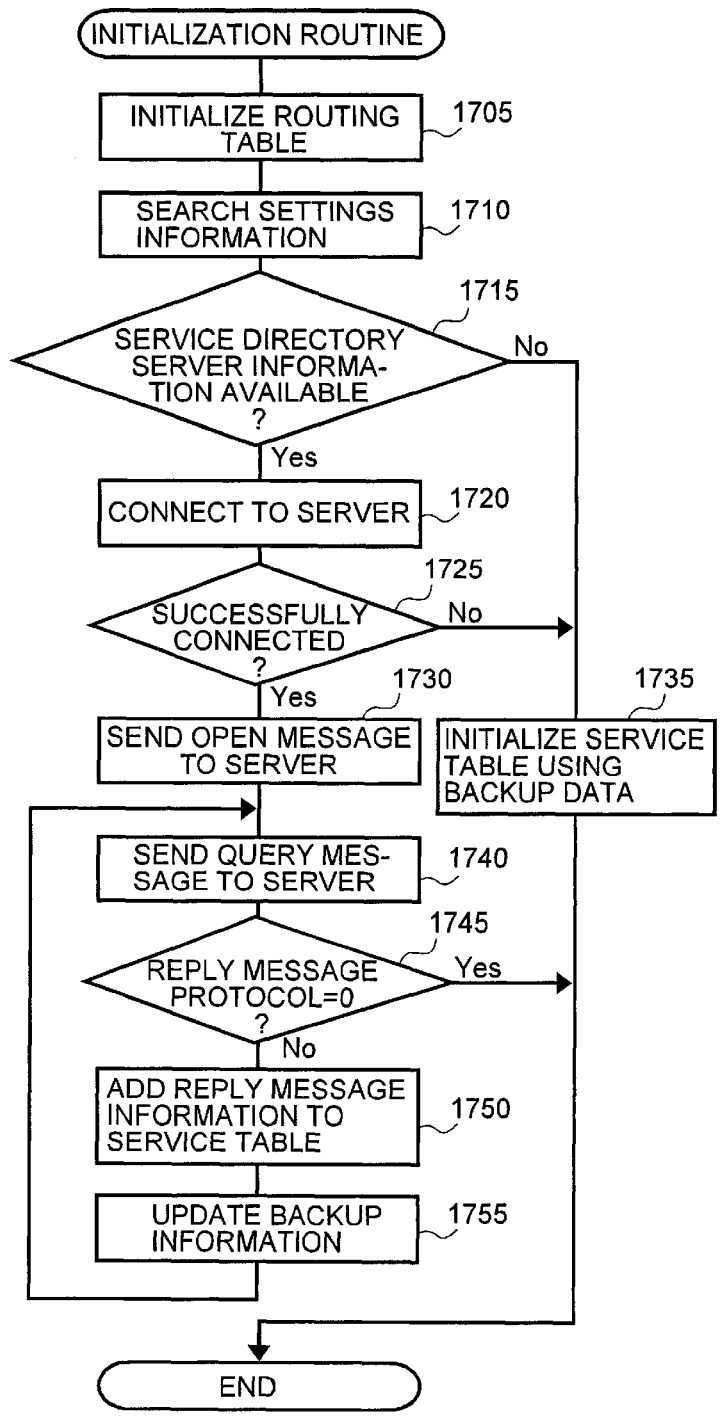
FIG. 12 is a flowchart for the purpose of describing the operations performed by a communication node 120.

FIG. 12 is a flowchart for the purpose of describing the operations performed by the communication node 120 in the sequence shown in FIG. 8.

In FIG. 12, the routing table controller 545 initializes the routing table stored in the routing table storage unit 565 (step 1705). In a normal initialized state the routing table does not contain routing information, but if default routing settings are in the settings information storage unit 550, that routing information is set up in the routing table.

Next, the service controller 540 searches via the controller 510 for information relating to the service directory server 100 from the settings information stored in the settings information storage unit 550 (step 1710). Then, the service controller 540 checks to see if there is information relating to the service directory server 100 (step 1715), and if there is no information relating to the service directory server 100 control proceeds to step 1735. If information is stored in the backup file storage unit 555, this information is used to initialize the service table stored in the service table storage unit 560.

If, on the other hand, there is information about the service directory 100, control proceeds to step 1720 and the service controller 540 attempts to connect to the service directory server 100 identified by this information via the server communication unit 515 and the network interface 535. Then, step 1725 checks to see if the connection to the service directory server 100 was successful or not. If the connection to the service directory server 100 failed, control proceeds to step 1735, where if information is stored in the backup file storage unit 555, this information is used to initialize the service table stored in the service table storage unit 560.

If, on the other hand, connection to the service directory server 100 was successful, the service controller 540 sends the OPEN message described above to the service directory server 100 via the server communication unit 515 and the network interface 535 (step 1730). Receiving this, the service directory server 100 performs client registration for the communication node 120 that sent the OPEN message.

Next, the communication node 120 performs operations (steps 1740–1755) for obtaining all service information kept at the service directory server 100.

As described above, by setting the protocol number in a QUERY message to 0 (zero), the service information at the service directory server 100 can be obtained one at a time in sequence. The communication node 120 uses this feature and, at startup, obtains all the service information that the service directory server 100 has.

Thus, the service controller 540 first creates a QUERY message with a protocol number of 0 (zero) and sends this to the service directory server 100 via the server communication unit 515 and the network interface 535 (step 1740). Since the protocol number of the QUERY message is 0, the service directory server 100 extracts the service information it has and sends them one at a time as REPLY messages.

The service controller 540 receives a REPLY message via the server communication unit 515 and the network interface 535 and checks to see if the protocol number contained in a message is 0 or not (step 1745). If so, this indicates that all service information has been received and the operation is stopped. If the protocol number is not 0, the service information contained in the received REPLY message is added to the service table stored in the service table storage unit 560 (step 1750). A backup file is also updated so that the service directory server 100 will not have to be queried again when the communication server [?node?] 120 is restarted (step 1755), and then control returns to step 1740.

With the operations described above, the communication node 120 is able to obtain all the service information saved at the service directory server 100 and can initialize the service table based on this service information. Thus, the communication node 120 can transfer received packets to the appropriate service-providing servers 110 when necessary.

The following is a description of the operations performed by the service directory server 100.

Figure 13:
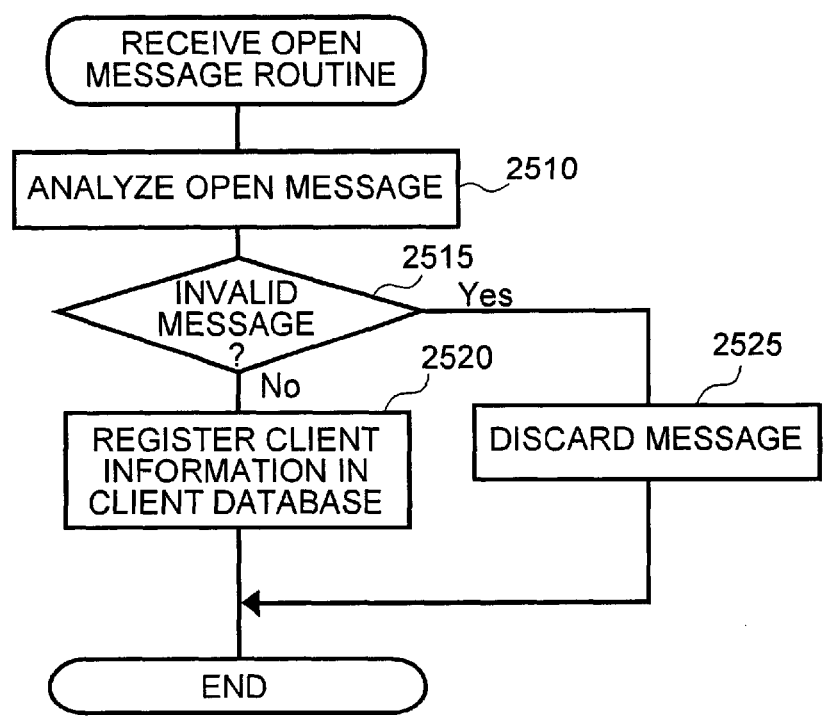
FIG. 13 is a flowchart showing the operations performed by a service directory server 100 when an OPEN message is received.
Figure 14:
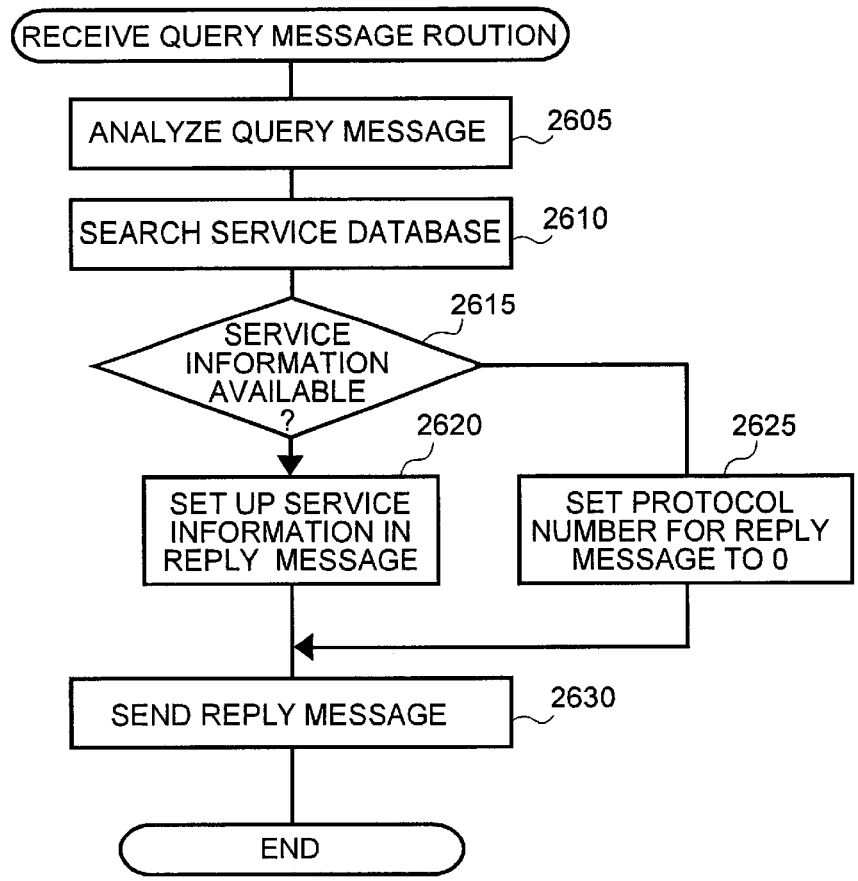
FIG. 14 is a drawing showing the operations performed by a service directory service 100 when a QUERY message is received.

FIG. 13 and FIG. 14 are flowcharts for the purpose of describing the operations performed by the service directory server 100 in the sequence shown in FIG. 8. FIG. 13 shows the operations performed when an OPEN message is received, and FIG. 14 shows the operations performed when a QUERY message is received.

In FIG. 13, when an OPEN message is received via the network interface 350, the client communication unit 340 extracts a node ID and authentication information from the message and analyzes their contents (step 2510) and checks to see if the message is a message that was sent from a legitimate communication node 120 installed in the network (step 2515). The authentication information can, for example, be an electronic signature added to the OPEN message based on secret information set up beforehand between the service directory server 100 and the communication node 120. This allows the received OPEN message to be compared with the message obtained after electronically signing it with the secret information described above, allowing the message to be authenticated as coming from a legitimate communication node 120.

If, as a result, the received OPEN message is found to be legitimate, control proceeds to step 2520 and the client information contained in the message such as a node ID is entered in the client database 380 (step 2520). If, on the other hand, the received OPEN message is not legitimate, the message is discarded (step 2525).

In FIG. 14, the client communication unit 340 receives a QUERY message via the network interface 350, extracts a protocol number and a port number from the message, and passes these on to the service request receiving unit 330. Receiving this, the service request receiving unit 330 analyzes the protocol number and the port number and confirms the contents of the query (step 2605). Then, the service database 370 is searched via the service database controller 320 for a service entry corresponding to the confirmed query (step 2610).

If a service entry is found that corresponds to the query, the information is sent to the client communication unit 340. Receiving this, the client communication unit 340 creates a REPLY message that contains the received service information (step 2620) and sends this message via the network interface 350 to the communication node 120 that sent the QUERY message (step 2630). If, on the other hand, no service entry was found to correspond to the query, the client communication unit 340 is notified on this. Receiving this, the client communication unit 340 creates a reply message having the protocol number set to 0, indicating that there is no service information (step 2625), and this is sent via the network interface 350 to the communication node 120 that sent the QUERY message (step 2630).

The above is a description of the initialization operations performed by the communication node 120.

The following is a description of the packet transfer operations (for registered services) performed by a communication node 120 when a received packet relates to a service registered in the service table held by the communication node 120.

Figure 15:
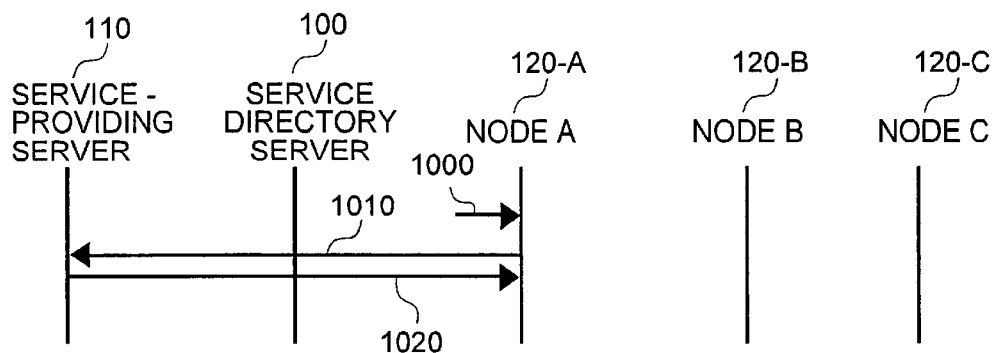
FIG. 15 is a drawing showing the sequence of packet transfer operations (for a registered service) between a communication node 120 and a service-providing server 110 that takes place in a communication node 120 when a packet is received for a service registered in a service table kept in the communication node 120.

FIG. 15 is a drawing showing the sequence of packet transfer operations (for registered services) performed by the communication node 120 between the communication node 120 and the service-providing server 110, when the communication node 120 receives a packet for a service registered in the service table of the communication node 120. In this figure, the combination of the communication node 120-A and the service-providing server 110 is shown, but the same operations apply to the other communication nodes 120.

When the communication node 120-A receives a packet, it checks the destination address of the packet to see if it is addressed to itself (sequence 1000). If it is addresses to itself, the service table is examined to determine a destination service-providing server 110 from the protocol number and the port number of the packet, and the packet is sent to the destination service-providing server 110 (sequence 1010). The service-providing server 110 that receives this packet processes the packet according to the service that it provides, and then notifies the results from the processing to the communication node 120-A that sent the packet (sequence 1020).

Next, the sequence of operations that take place during the packet transfer operation (registered service operation) between the communication node 120 and the service-providing server 110 will be described in detail, with the operations performed by the communication node 120 described separately from the operations performed by the service-providing server 110.

First, the operations performed by the communication node 120 will be described.

Figure 16:
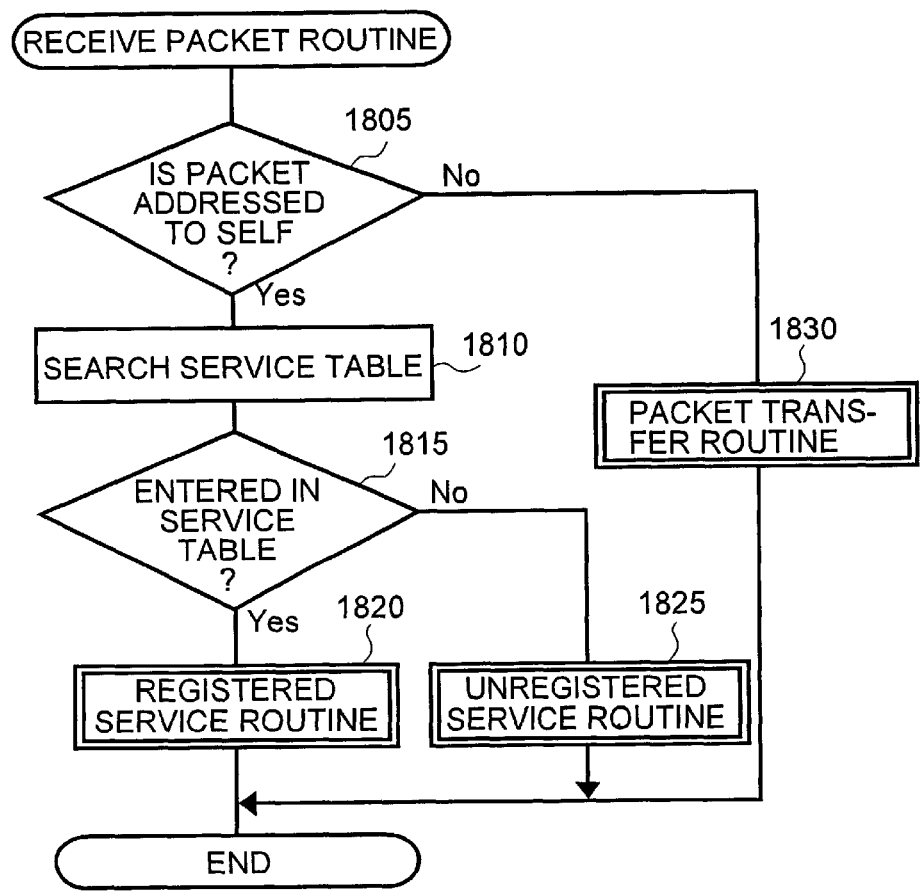
FIG. 16 is a flowchart for the purpose of describing the operations performed when a packet is received by a communication node 120.

FIG. 16 is a flowchart for the purpose of describing the operations performed when a packet is received by the communication node 120.

First, the packet transfer processing unit 530 determines the destination address of the packet that was received via the network interface 535 and checks to see if the packet is addressed to itself (step 810). If the packet is not addressed to itself, control proceeds to step 1830, where the packet transfer operation between the communication nodes 120, described later, is performed.

If, on the other hand, the packet is addressed to itself, the packet is passed on to the service assignment unit 525. Receiving this, the service assignment unit 525 searches the service table stored in the service table storage unit 560 via the service controller 540 (step 1810). The service assignment unit 525 checks to see if a service entry having an assignment condition that matches the protocol number and port number of the received packet is registered in the service table (step 1815).

If no service entry is found registered in the service table with an assignment condition that matches the protocol number and the port number of the received packet, control proceeds to step 1825 and the unregistered service operation, described later, is performed.

If, on the other hand, a service entry having an assignment condition that matches the protocol number and the port number of the received packet is registered in the service table, control proceeds to step 1820 and the registered service operation is performed according to the sequence shown in FIG. 15.

Figure 17:
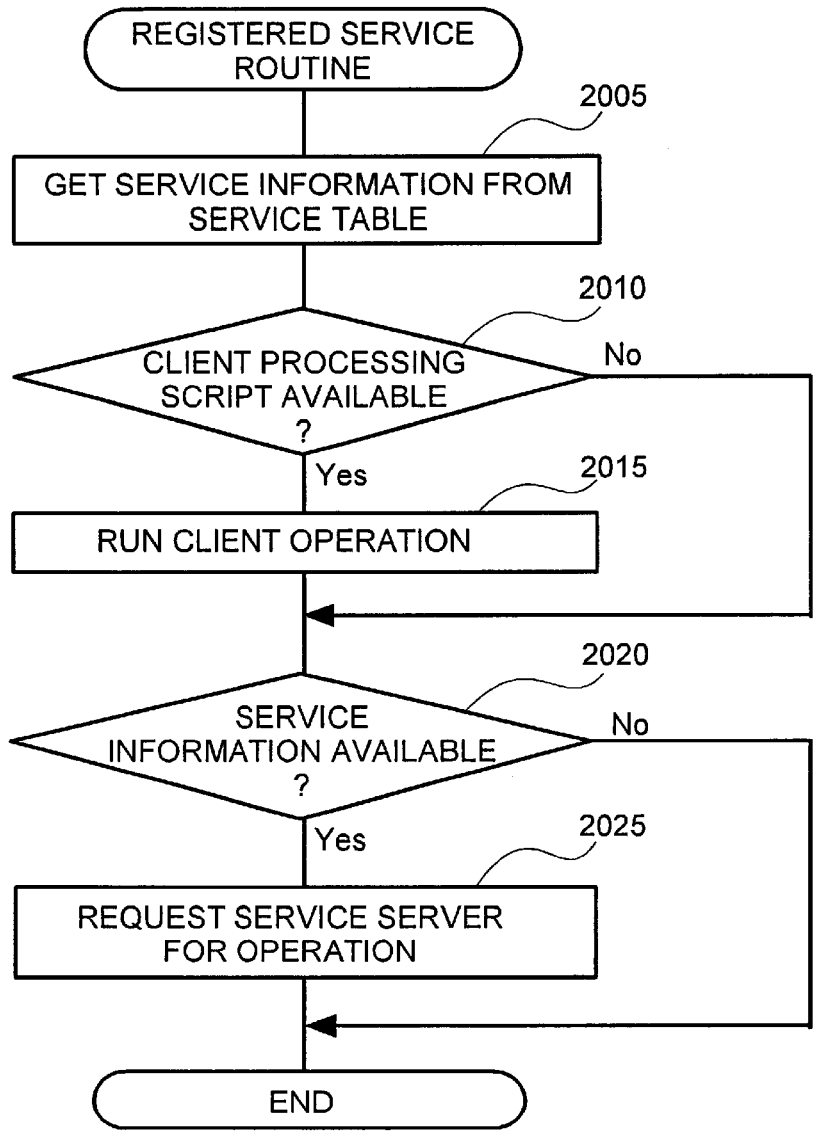
FIG. 17 is a flowchart for the purpose of describing the operations performed for the services registered in a communication 120.

FIG. 17 is a flowchart for the purpose of describing the operations (registered service operation) performed at step 1820 in FIG. 16.

First, the service assignment unit 525 uses the service controller 540 to obtain from the service table stored in the service table storage unit 560 a service entry that has an assignment condition that matches the protocol number and the port number of the received packet (step 2005), and checks if this entry includes a client processing script or not (step 2010). If client processing is included, the specified client processing is performed by the automatic processor 520 (step 2015). Otherwise, the subsequent operations are performed.

Next, the service assignment unit 525 checks to see if the retrieved service entry contains server information (step 2020) and if it does not the operation is terminated. If, on the other hand, it does, then the address of the service-providing server 110 specified in the server entry is sent along with the packet to the server communication unit 515.

Receiving this, the server communication unit 515 sends the packet via the network interface to the service-providing server 110 specified by the received address (step 2025).

Next, the operations (service-providing operation) performed by the service-providing server 110 will be described.

Figure 18:
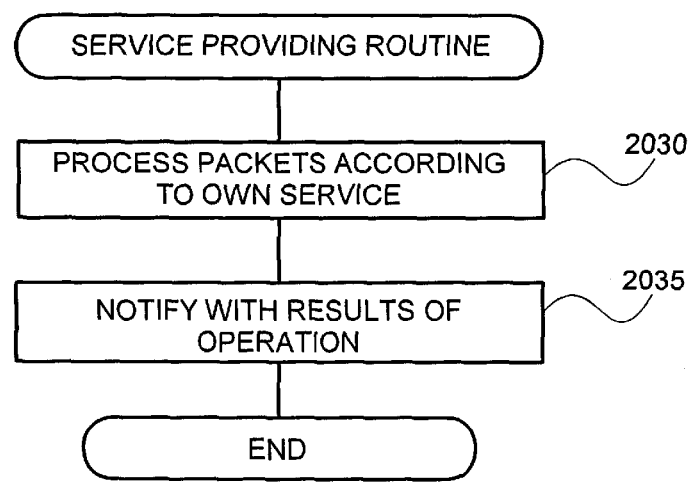
FIG. 18 is a flowchart for the purpose of describing the operations performed by a service-providing service 110.

FIG. 18 is a flowchart for the purpose of describing the operations performed by the service-providing server 110 in the sequence shown in FIG. 15.

First, when a packet is received via the network interface 450, the client communication unit 440 sends the packet to the service processing unit 430.

Receiving this, the service processing unit 430 processes the received packet according to the service it provides (step 2030). The client processing unit 440 notifies the communication node 120 via the network interface 450 of the results of the processing performed by the service processing unit 430 (step 2035).

The above was a description of the packet transfer operations (registered service operation) performed when a communication 120 receives a packet for a service that is registered in its own service table.

The following is a description of the packet transfer operations (unregistered service operation) performed when a packet is received by the communication node 120 for a service that is not registered in its service table.

Figure 19:
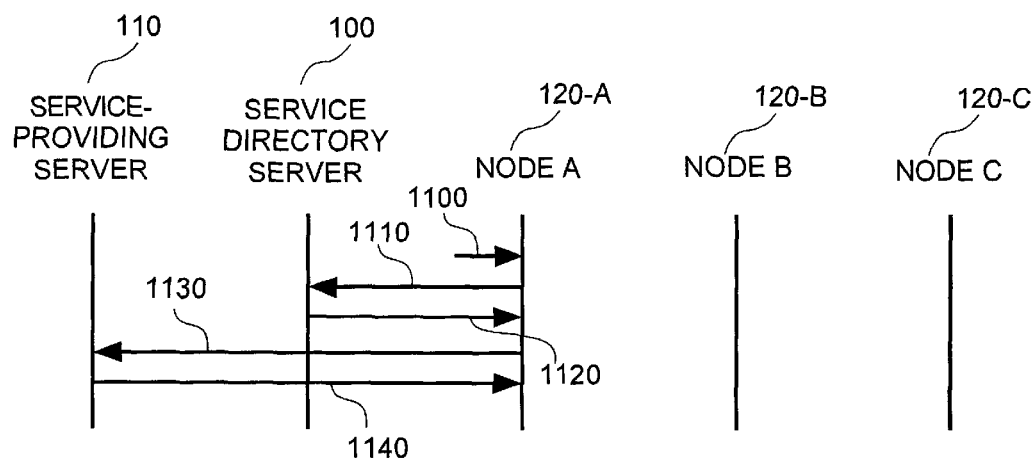
FIG. 19 is a drawing showing the sequence of packet transfer operations (for an unregistered service) performed by a communication node 120 for transferring a packet between a communication node 120 and a service directory server 100 or a service-providing server 110 when a packet is received for a service that is not registered in a service table kept in the communication node 120.

FIG. 19 is a figure showing the sequence of operations (unregistered service operation) performed for transferring packets between the communication node 120 and the service directory 100 and a service-providing server 110 when a packet is received by the communication node 120 for a service that is not registered in its service table. This figure shows the combination of the communication node 120-A, the service directory server 100 and the service-providing server 110, but the same operations are performed for the other communication nodes 120 as well.

The communication node 120-A receives a packet and checks the destination address of the packet to see if it is addressed to itself or not (sequence 1100). If it is addressed to itself, the service table is examined to determine a destination service-providing server from the protocol number and the port number of the packet. If a destination service-providing server 110 associated with the protocol number and the port number of the packet is formed, a QUERY message specifying the protocol number and the port number is sent to the service directory server 100 to query service information for this packet (sequence 1110).

The service directory server 100 receives this and if there is service information associated with the protocol number and the port number specified in the received QUERY message, the service directory server 100 sends a REPLY message containing the information to the communication node 120 that sent the QUERY message. If there is no associated service information, a REPLY message with the protocol number set to 0 is sent (sequence 1120).

The communication node 120-A transfers the packet to the destination service-providing server 110 specified by the received REPLY message (sequence 1030). The service-providing server 110 receiving this packet performs the operations corresponding to the service that it offers on the packet and then notifies the communication node 120-A that sent the packet of the results of the operation (sequence 1140).

Next, the sequence of operations (unregistered service operation) shown in FIG. 19 performed to transfer packets between the communication node 120 and the service directory server 100 and the service-providing server 110 will be described in detail.

The operations performed by the service directory server 100 and the operations performed by the service-providing server 110 are similar to those shown in FIG. 14 and FIG. 18, respectively, so that these descriptions will be omitted and only the operations performed by the communication node 120 will be described.

Figure 20:
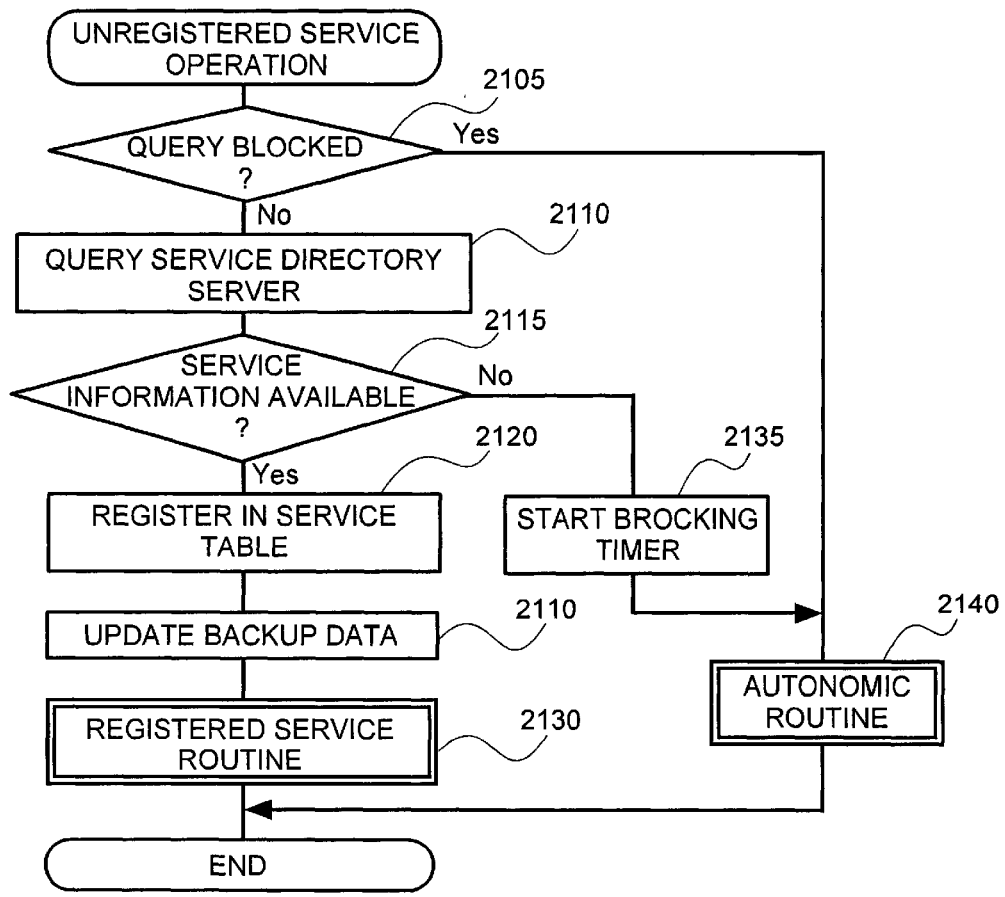
FIG. 20 is a flowchart for the purpose of describing the operations performed by a communication node 120 for unregistered services.

FIG. 20 is a flowchart for the purpose of describing the operations (unregistered service operation) performed at step 1825 of FIG. 16. This flow of operations corresponds to the operations performed by the communication node 120 in the sequence shown in FIG. 19.

When a packet for an unregistered service is received, the communication node 120, as a rule, queries the service directory server 100 and checks for information regarding a server providing the service, as shown in FIG. 19. However, if this type of querying operation is performed each time a packet for an unregistered service is received, the packet processing performance will be greatly reduced due to the queries to the service directory server 100.

Therefore, if the service directory server 100 is queried for an unregistered service and no service information about a server providing the service could be obtained, then, for a fixed time, querying is blocked for packets for the same service, thus preventing queries for the same service.

First, the service assignment unit 525 checks the service table stored in the service table storage unit 560 to see that no service information is registered with an assignment condition that matches the protocol member and the port number of the received packet, and then checks to see if queries to the service directory server 100 regarding service information for this packet is being blocked or not (step 2105).

If queries are being blocked, control proceeds to step 2140 and the automatic operations described later are performed by the automatic processor 520. If, on the other hand, queries are not being blocked, the server communication unit 515 is notified of the protocol number and the port number of the packet. Receiving this, the server communication unit 515 creates a QUERY message that specifies the received protocol number and port number, and sends this to the service directory server 100 via the network interface 535, thus issuing a query for service information (step 2110).

Next, the server communication unit 515 receives the REPLY message in response to the QUERY message described above from the service directory interface 535 via the network interface 535. Then, the protocol number contained in the message is examined and the server communication unit checks to see if there is service information for the received packet for the unregistered service (step 2115). If no service information was obtained, the service assignment unit 525 is notified of this. Receiving this, the service assignment unit 525 starts an internal blocking timer and sets up a fixed time for blocking packets relating to this unregistered service (step 2135). Then, control proceeds to step 2140 and the autonomic operations, described later, are performed by the autonomic processor 520.

If, on the other hand, service information was obtained at step 2115 for the received packet relating to the unregistered service, the server communication unit 515 registers the service information contained in the REPLY message in the service table stored in the service table storage unit 560 (step 2120), and also registers this information in the backup file stored in the backup file storage unit 555 (step 2125). Then, the registered service operations are performed on the received packet according to the flow of operations shown in FIG. 17 (step 2130).

Figure 21:
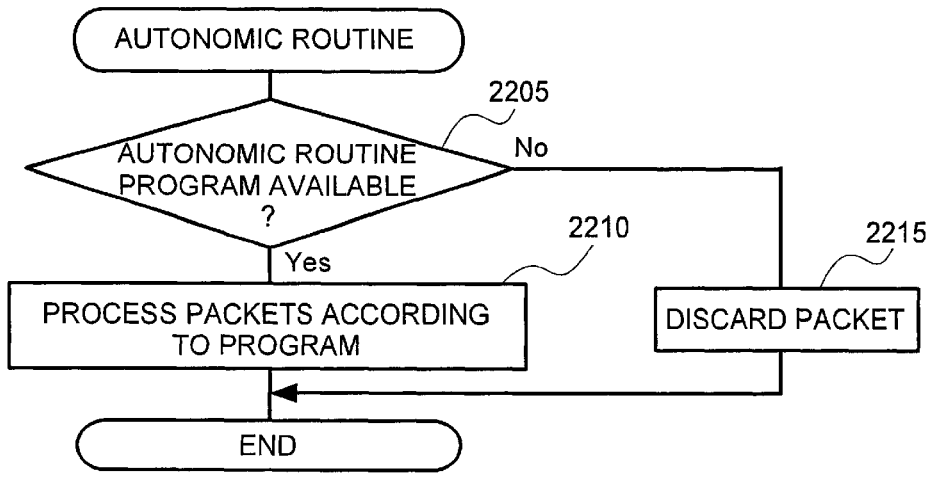
FIG. 21 is a flowchart for the purpose of describing autonomous operations performed by a communication node 120.

FIG. 21 is a flowchart for the purpose of describing the operations (automatic operation) performed at step 2140 in FIG. 20.

In FIG. 20, the communication node 120 must perform autonomic processing on the packet relating to a service for which service information could not be obtained even after querying the service directory server 100. If the communication node 120 already includes a program for processing this type of packet, this program is used. Otherwise, the packet is discarded as being unprocessable.

If the received packet is for a service not entered in the service table and the service information can also not be obtained by querying the service directory server 100, the service assignment unit 525 passes the packet on to the automatic processor 520. Receiving this, the autonomic processor 520 checks to see if it has an autonomic processing program set up to handle the protocol number and the port number of the received packet (step 2205). If such an automatic processing program is available, the packet is processed according to this program (step 2210). If, on the other hand, such an automatic processing program is not available, the packet is discarded (step 2215).

The above was a description of the operations (unregistered service operation) performed by the communication node 120 when a received packet is for a service that is not registered in its own service table.

Next, the packet transfer operations between the communication nodes 120 will be described.

Figure 22:
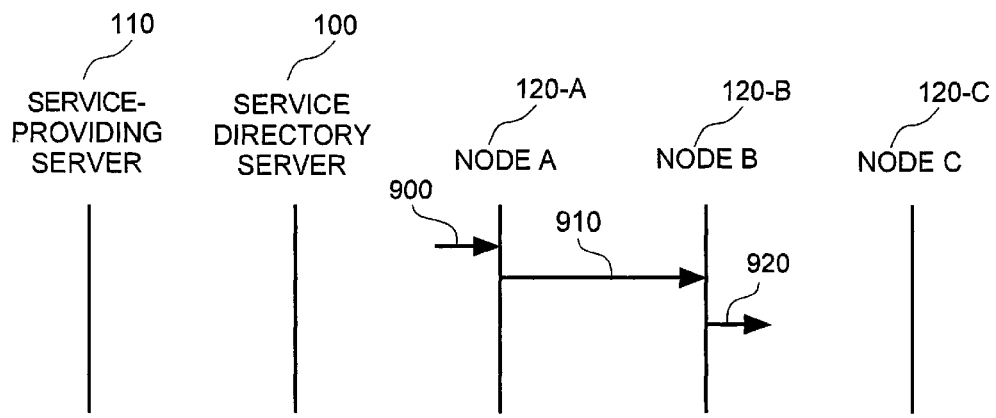
FIG. 22 is a drawing showing a sequence of packet transfer operations performed between communication nodes 120.

FIG. 22 is a drawing showing the sequence of operations performed for transferring packets between the communication nodes 120. This figures shows the operations performed to transfer a packet from the communication node 120-A to the communication node 120-B, but the same operations are performed for other communication nodes 120.

When a packet is received, the communication node 120-A checks the destination address of the packet to determine if it is addressed to itself or not (sequence 900). If the packet is not addressed to itself, the routing table is examined to determine a destination gateway for the destination address. If, as a result, the destination is the communication node 120-B, the packet is transferred to the communication node 120-B (sequence 910). The communication node 120-B receiving the packet performs similar operations and transfers the packet to a destination address (sequence 920).

Figure 23:
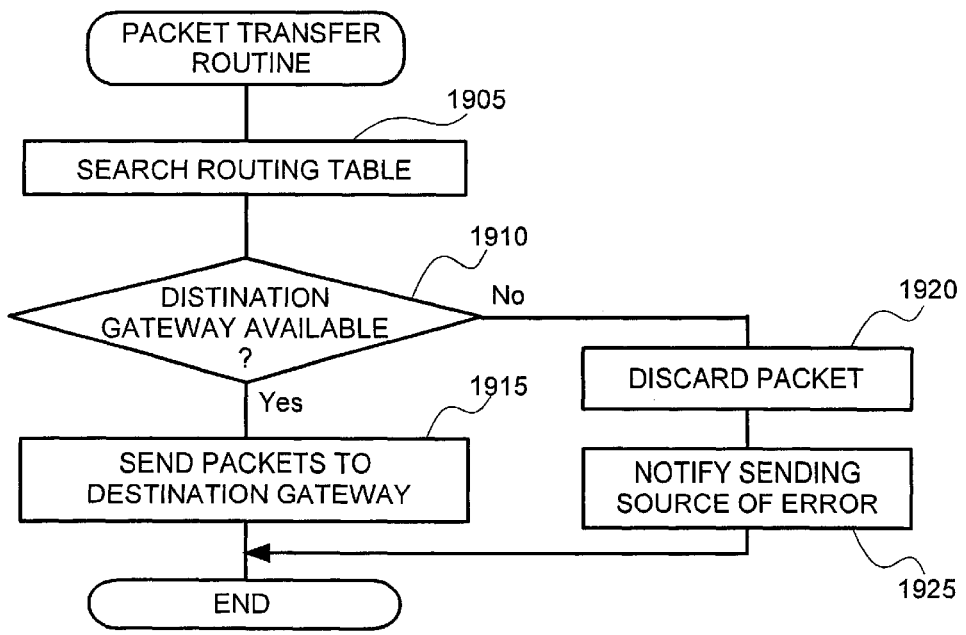
FIG. 23 is a flowchart for the purpose of describing packet transfer operations performed by a communication node 120.

FIG. 23 is a flowchart for the purpose of describing the operations (packet transfer operation) performed at step 1830 in FIG. 16. This flowchart shows the operations performed by the communication nodes 120 in the sequence shown in FIG. 22.

First, using the destination address of the packet received via the network interface 535 as the key, the packet transfer processing unit 530 uses the routing controller 545 to search the routing table stored in the routing table storage unit 565 (step 1905), and checks to see if there is information about a destination gateway associated with the address (step 1910). If information for a destination gateway is found, the packet is transferred to the destination gateway via the network interface 535 (step 1915). If, on the other hand, there is no information about a destination gateway, the packet is discarded (step 1920), and the packet source is notified of an error (step 1925).

The above was a description of the packet transfer operations between the communication nodes 120.

The following is a description of the operations (service registration operation) performed when a service-providing server 110 is newly added to the network or when there is a change in the service provided by a service-providing server 110, and the service-providing server 110 registers its own services in the service directory server 100.

Figure 24:
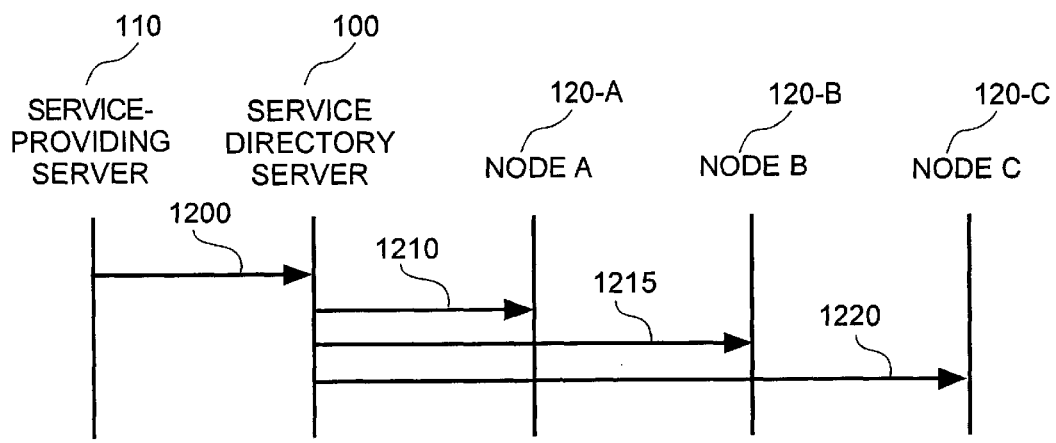
FIG. 24 is a drawing showing a sequence of operations (for registered services) performed by a service-providing server 110 to register its service information to a service directory server 100 when a service-providing server 110 is newly added to a network or when the services provided by a service-providing server 110 changes.

FIG. 24 is a drawing showing the sequence of operations performed when a service-providing server 110 is newly added to the network or when there is a change in the service provided by a service-providing server 110, and the service-providing server 110 registers its own services in the service directory server 100.

First, if a new service-providing server 110 is installed in the network or if the services provided by a service-providing server 100 change, the service information for the services it provides is sent to the service directory server 100 (sequence 1200). Receiving this, the service directory server 100 registers the received service information in the service database, and sends a NOTIFY message containing the service information to each of the communication nodes 120-A–120-C (sequences 1210–1220).

Figure 25:
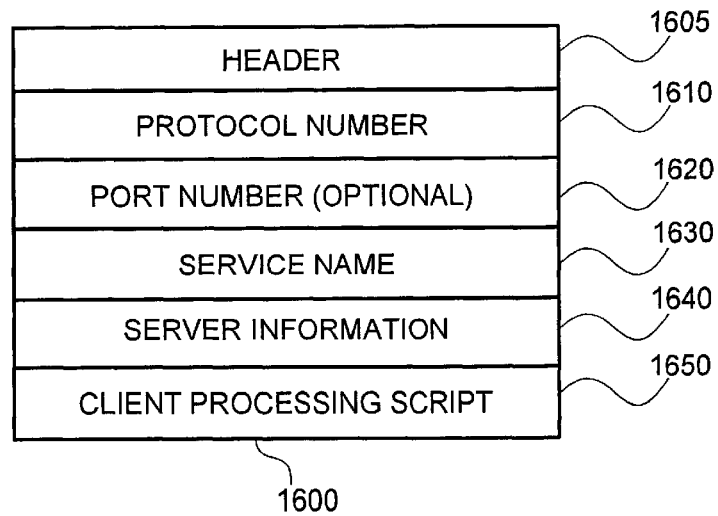
FIG. 25 is a drawing for the purpose of describing the contents of a NOTIFY message sent from a service directory server 100 to each communication node 120.

FIG. 25 is a drawing for the purpose of describing the contents of the NOTIFY message sent from the service directory server 100 to each of the communication nodes 120. A header 1605 is a message header containing a message type and a message length. A protocol number 1610 and a port number 1620 is a protocol number and a port number associated with a service. The protocol number 1610 and the port number 1620 have the same meanings as the protocol number 1420 and the port number 1430 contained in the QUERY message shown in FIG. 10. A service name 1630 is a string representing a service type and is used to facilitate administration of specific service information. A server information 1640 is information relating to the service-providing server 110 providing the service. This information includes at least the address of the service-providing server 110.

The client processing script 1650 is a type of program that represents a series of operations to be performed by the communication node 120 so that the service-providing server 110 can perform a service. For services that do not require client processing, the client processing script 1650 is left blank.

Returning to FIG. 24, each of the communication nodes 120-A–120-C receiving a NOTIFY message updates its own service table based on the information contained in the message.

Next, the service registration operation sequence will be described in further detail, with the operations performed by the service-providing server 110 described separately from the operations performed by the communication node 120.

First, the operations performed by the service-providing server 110 will be described.

Figure 26:
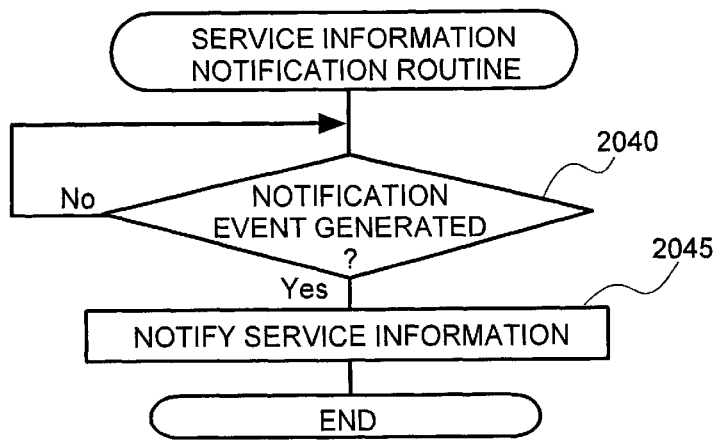
FIG. 26 is a flowchart for the purpose of describing the operations performed by a service-providing server 110.

FIG. 26 is a flowchart for the purpose of describing the operations performed by the service-providing server 110 in the sequence shown in FIG. 24.

First, the server communication unit 460 waits for a notification event for service information to be generated (step 2040). This notification event for service information is generated by a service-providing server 110 when it needs to send information about its own services to the service directory server 100, e.g., when the service-providing server 110 is used for the first time after being installed in the network or when the services provided by service-providing server 110 change. If a notification event for service information is generated, the server communication unit 460 notifies the service directory server 100 via the network interface 450 of its own services.

Next, the operations performed by the service directory server 100 will be described.

Figure 27:
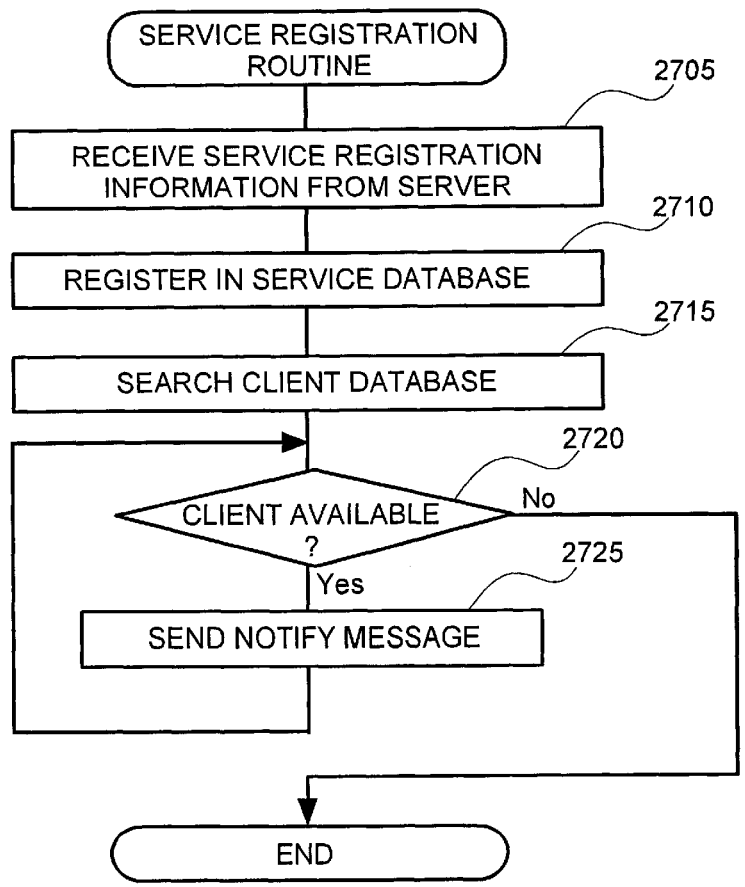
FIG. 27 is a flowchart for the purpose of describing the operations performed by a service directory server 100.

FIG. 27 is a flowchart for the purpose of describing the operations performed by the service directory server 100 in the sequence of operations shown in FIG. 24.

First, the server communication unit 360 receives the service information from the service-providing server 110 via the network interface 350 (step 2705) and registers this information in the service database 370 using the service database controller 320 (step 2710). This service information is also passed on to the client communication unit 340. Receiving this, the client communication unit 340 follows the instructions from the server communication unit 340 and searches the client database 380 to see if there is information about the communication node 120 registered as a client database 380 (step 2715). If this information is present, a NOTIFY message described above containing the service information received from the service-providing server 110 is sent via the network interface 350 to each of the registered communication nodes 120 (step 2720, 2725).

The following is a description of the operation performed by the communication node 120.

Figure 28:
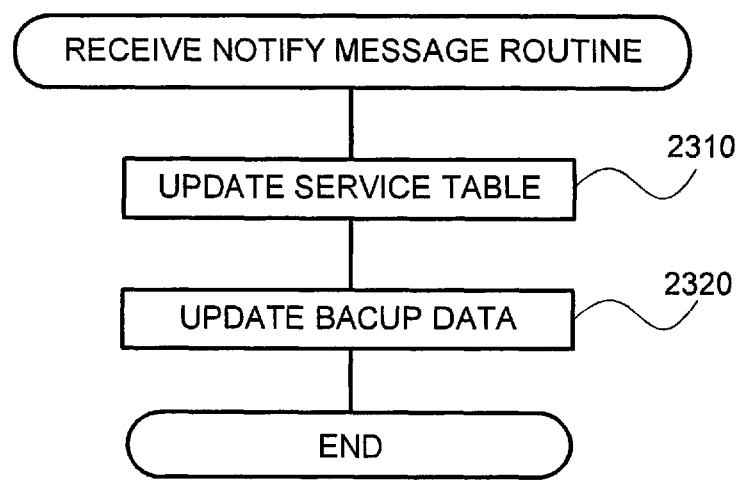
FIG. 28 is a flowchart for the purpose of describing the operations performed by a communication node 120.

FIG. 28 is a flowchart for the purpose of describing the operations performed by the communication node 120 in the sequence shown in FIG. 24.

First, the server communication unit 515 receives a NOTIFY message from the service directory server 100 via the network interface 535 and passes on the service information contained in the message to the service controller 540. Receiving this, the service controller 540 updates the service table stored in the service table storage unit 560 based on the received service information (step 2310), and updates the backup file stored in the backup file storage unit 555 (step 2320).

The above was a description of the operations (service registration operation) performed to register the service information of a service-providing server 110 to the service directory server 100 when the service-providing server 110 has been newly added to the network or the services provided by the service-providing server 110 have been changed.

Finally, the initialization operations for the service directory server 100 will be described.

The initialization operations for the service directory server 100 are performed when the service directory server 100 is installed in the network and used for the first time.

Figure 29:
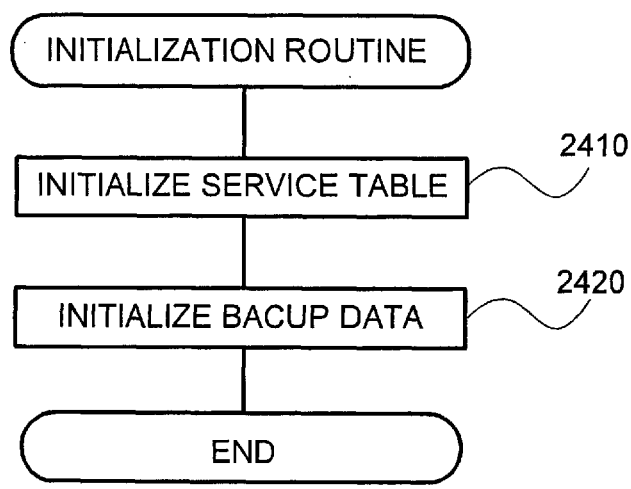
FIG. 29 is a flowchart for the purpose of describing initialization operations performed by a service directory server 100.

FIG. 29 is a flowchart for the purpose of describing the initialization operations for the service directory server 100.

When the service directory server 100 is started up, the service database controller 320 initializes the service database 370 by, for example, registering default service information into the database (step 2410). The client communication unit 340 initializes the client database 380 and registers, for example, default client information into the database (step 2420).

The above was a description of the best mode of the present invention.

The service directory server 100 provides unified management of service information for the service-providing server 110 installed in the network. Also, this service information is distributed to the communication nodes 120 automatically or in response to requests from the communication nodes 120. For example, if a communication node 120 is newly installed, a query is sent from the communication node 120 and the service directory server 100 sends service information for the service-providing server 110 that it controls to the communication node 120. Also, if a service-providing server 110 notifies the service directory server 100 of service information, the notified service information is sent to each of the communication nodes 120 registered in its client database 380.

The communication nodes 120 receives packets, and, for the packets addressed to itself, a service-providing server 110 to process the packet is determined based on the service information provided by the service directory server 100. This packet is then transferred to the selected service-providing server 110 so that the packet can be processed by the service-providing server 110.

Thus, unlike conventional network systems, the network administrator does not need to enter settings for all the communications nodes 120 even if a service-providing server 110 is newly added to the network or if there is a change in the services provided by an existing service-providing server 110. The network administrator need only maintain and manage the service information stored at the service directory server 100 or change the information as necessary. Thus, network administration costs can be reduced. Also, since this reduces the amount of work required by the network administrator for making settings, errors by the network administrator in the settings can be reduced. Furthermore, the time required to enter settings can be significantly reduced.

The service directory server 100 also manages sessions with each of the communication nodes 120 via the client communication unit 340. Thus, the service information provided for individual communication nodes 120 can be changed. Furthermore, it would also be possible to divide the plurality of communication nodes 120 into a number of groups and to change the provided service information so that each group uses different service-providing servers 110.

Also, when the service directory server 100 automatically distributes service information to each of the communication nodes 120, the service information is contained in a NOTIFY message. By using the NOTIFY message in this way, the service directory server 100 is able to notify individual communication nodes 120 of service information at any time. Thus, for example, the service-providing servers 110 used by individual communication nodes 120 can change at certain times to other service-providing servers 110.

Furthermore, the service directory server 100 checks the access privileges of the communication node 120 with regard to the service directory server 100 by using authentication information contained in the OPEN message.

This allows service information to be provided from the service directory server 100 only to the communication nodes 120 that have legitimate privileges.

The present invention is not restricted to the embodiment described above, and various modifications can be affected.

For example, the service directory server 100 checks the access privileges of the communication node 120 with regard to the service directory server 100 by using authentication information contained in the OPEN message. However, it would also be possible to have a separate authentication server installed to check the access privilege of the communication nodes 120 with regard to the service directory server 100. When the service directory server 100 receives an OPEN message from a communication node 120, the authentication information contained in the message is transferred to the authentication server, and the authentication server uses the received authentication information to check the access privilege of the communication node 120 with regard to the service directory server 100.

An independent protocol is defined and used for defining service information and retrieving service information through the network, but it would also be possible to use directory access protocols such as LDAP (Lightweight Directory Access Protocol) or distributed object technology such as CORBA (Common Object Request Broker Architecture).

A single service directory server 100 is installed in the network, but it would also be possible to have redundant service directory servers 100. In normal operations, the master (operating) service directory server 100 would be run. In the event of a failure in the master service directory server 100, however, the slave (preparatory) service directory server 100 would be activated instead.

What is claimed is:

1. A communication network system comprising:
   at least one communication node, having a routing function, transferring a received packet to a destination affixed to said packet;
   a plurality of servers providing a predetermined service
   a directory server;
   said directory server including a database storing a plurality of service information relating to conditions for receiving a service provided by each of said servers, and an information providing unit providing said service information to said communication node; and
   said communication node including means for determining a server among said plurality of servers for processing a packet of a predetermined type, out of all received packets, based on said service information provided by said directory server, and means for transferring said packets of said predetermined type to said server determined by said determining means.

2. A communication network system as described in claim 1 wherein:
   a query is sent to said directory server regarding a server for processing said packet of said predetermined type if, for said packet of said predetermined type, said determining means determines that a server for processing said packet is not contained in said service information provided by said directory server; and
   said information providing means of said directory server searches service information relating to a server associated with said query sent from said query sent from said communication node and sends results of said search to said communication node that sent said query.

3. A communication network system as described in claim 2 wherein queries to said directory server regarding processing of said packet of said predetermined type are blocked for a predetermined time if said determining means of said communication node did not obtain information from said directory server in response to said query sent to said directory server regarding a server to process said packet of said predetermined type.

4. A communication network system as described in claim 2 wherein:
   said server notifies said directory server of information about services provided by said server when said server is newly connected to said communication network system; and
   said directory server stores said service information from said newly connected server and uses said information providing means to notify said plurality of communication nodes of said service information.

5. In a communication network system including a plurality of servers providing a predetermined service and a directory server,
   a communications node, having a routing function, transferring received packets to a destination affixed to said packet comprising:
   means for determining a server for processing a packet of a predetermined type, out of all received packets, based on a plurality of service information, provided by said directory server, relating to conditions for receiving services provided by said servers; and
   means for transferring said packets of said predetermined type to said server determined by said determining means.

6. A communication node as described in claim 5 wherein queries to said directory server regarding processing of said packet of said predetermined type are blocked for a predetermined time if said determining means of said communication node did not obtain information from said directory server in response to said query sent to said directory server regarding a server to process said packet of said predetermined type.

7. A communication node as described in claim 5 wherein said means for determining a server is further comprised of comprises:
   an input/output control unit receiving information from an input/output device;
   a settings information storage unit storing IP address information and settings information needed for IP transfer based on information from said input/output control unit;
   a network interface receiving packets from said network;
   a route storage unit storing a transfer destination for a packet received from said network interface in association with a destination address, a netmask, a gateway address, and an interface;
   a service storage unit storing information provided by said directory server in the form of a service type provided by a server connected to said network associated with an address of said server;
   a packet processing unit determining a gateway associated with a destination address of a packet received from said network interface; and wherein said means for transferring said packets comprises;
   an assigning unit assigning a packet received from said network interface to either be transferred to said server or to be processed internally based on information from said service storage unit;
   an automatic processing unit processing received packets assigned by said assigning unit; and
   a server communication unit for transferring said received packet to said server based on the assignment by said assigning unit.

8. In a communication network system including: at least one communication node, having a routing function, transferring a received packet to a destination affixed to said packet and, of said received packets, transferring packets of a predetermined type to a server for processing; and a plurality of servers providing a predetermined service,
   a directory server comprising:
   means for storing a plurality of service information, provided by said servers, related to conditions for receiving services; and
   means for providing said plurality of service information stored in said storing means to said communication node either automatically or in response to a request from said communication node.

9. A directory server as described in claim 8 wherein said service information from a newly connected server is stored in said storing means and said information providing means notifies said plurality of communication nodes of said service information.

10. A method for controlling a packet as a service provided by a server node, the packet being received by a communication node, the communication node and the server node being coupled with a directory server node and with each other via a network, the method comprising the steps of:

providing, by the directory server node, service information to the communication node, the service information being related to a condition for providing a service by at least one server node;

receiving, by the communication node, a packet to be processed;

determining, by the communication node, a server that is requested to process the packet based on a type of the received packet and the service information received from the directory server;

transferring, by the connection node, the packet to the determined server node;

processing, by the server node, the packet as service that the server provides; and notifying, by the server node, the communication node of the resulting process.

11. A method for controlling services in a communication network system as described in claim 10 wherein:
   said communication node sends a query to said directory server, said query regarding a server for processing a packet of said type if said communication node determines that a server for processing said packet of said type is not designated in said service information provided by said directory server; and
   said directory server searches for service information relating to a server associated with said query sent from said communication node and provides results of said search to said communication node.

12. A method for controlling services in a communication network system as described in claim 11 wherein:
   said server notifies said directory server of information about services provided by said server when said server is newly connected to said communication network system; and
   said directory server stores said service information from said newly connected server and notifies said plurality of communication nodes of said service information.

13. A method for controlling services in a communication network system as described in claim 11 wherein:
   said communication node blocks, for a predetermined time, queries to said directory server regarding processing of said packet of said predetermined type if said communication node did not obtain information from said directory server in response to said query sent to said directory server regarding a server to process said packet of said predetermined type.

14. A method for controlling services in a communication network system as described in claim 10 wherein said communication node blocks, for a predetermined time, queries to said directory server regarding processing of said packet of said predetermined type if said communication node did not obtain information from said directory server in response to said query sent to said directory server regarding a server to process said packet of said predetermined type.

15. A method for controlling services according to claim 10, wherein the service information is provided, in response to a request of the communication node, or when it is decided that the service information should be revised.

* * * * *